(12) United States Patent
Lin et al.

(10) Patent No.: US 10,197,146 B2
(45) Date of Patent: Feb. 5, 2019

(54) REDUCER MODULE WITH REAL-TIME TORQUE SENSING

(71) Applicant: PRECISION MACHINERY RESEARCH & DEVELOPMENT CENTER, Taichung (TW)

(72) Inventors: Chun Tsun Lin, Taichung (TW); Chia Yu Cheng, Miaoli County (TW); Jia He Chen, Taichung (TW)

(73) Assignee: Precision Machinery Research & Development Center, Taichung (TW)

( * ) Notice: Subject to any disclaimer, the term of this patent is extended or adjusted under 35 U.S.C. 154(b) by 210 days.

(21) Appl. No.: 15/392,188

(22) Filed: Dec. 28, 2016

(65) Prior Publication Data

US 2018/0180153 A1     Jun. 28, 2018

(51) Int. Cl.
*F16H 35/00*     (2006.01)
*F16H 49/00*     (2006.01)
*G01L 3/10*      (2006.01)

(52) U.S. Cl.
CPC ............ *F16H 49/001* (2013.01); *G01L 3/108* (2013.01)

(58) Field of Classification Search
CPC ..................................................... F16H 49/001
See application file for complete search history.

(56) References Cited

U.S. PATENT DOCUMENTS

| | | | | |
|---|---|---|---|---|
| 4,624,621 A * | 11/1986 | Murakami | ................. | B25J 9/06 414/735 |
| 8,117,945 B2 * | 2/2012 | Nakamura | ................. | F16H 1/32 475/163 |
| 9,644,727 B2 * | 5/2017 | Yajima | .................... | H02K 7/116 |
| 9,772,020 B2 * | 9/2017 | Maruyama | ............ | F16H 49/001 |
| 9,783,262 B2 * | 10/2017 | Dubose | .................... | B62M 6/55 |
| 2001/0044356 A1 * | 11/2001 | Takeuchi | ................. | F16H 1/32 475/178 |

* cited by examiner

*Primary Examiner* — Ha Dinh Ho
(74) *Attorney, Agent, or Firm* — Rosenberg, Klein & Lee

(57) ABSTRACT

A reducer module with real-time torque sensing includes two harmonic reducers that are installed in opposite directions in a casing and located in front of and behind a ring, respectively; and a plurality of torque sensors mounted on ribs of the ring for measuring a torque value. The ring's inner circle, the front harmonic reducer, and the rear harmonic reducer are centrally bored to form a channel, through which wires of the torque sensors go out the reducer module and are prevented from torsion and stretch during operation of the reducer module.

5 Claims, 6 Drawing Sheets

REDUCER MODULE WITH REAL-TIME TORQUE SENSING

BACKGROUND OF THE INVENTION

1. Technical Field

The present invention relates to reduction gears, and more particularly to a reducer module with real-time torque sensing.

2. Description of Related Art

As shown in FIG. 6, a conventional reducer module with torque sensing comprises a reducer 91, a motor 92, and a torque sensor 93. The reducer 91 connects a gear 911, and the motor 92 connects a pinion 921 that engages with the gear 911. When the motor 92 drives the pinion 921 to rotate, the gear 911 is driven to rotate, so that an output shaft 912 coaxially arranged with the gear 911 performs decelerated rotation. The torque sensor 93 is provided at the output shaft 912. When the output shaft 912 rotates, the torque sensor 93 measure output torque in a real-time manner, so as to provide control and correction in terms of torque.

While the foregoing reducer module commonly seen in automotive steering mechanism can be used in a robot arm to measure output torque, wires (not shown) electrically connected the motor 92 can have undesired torsion or stretch as the robot arm changes postures.

SUMMARY OF THE INVENTION

The primary objective of the present invention is to address the aforementioned issue by providing a reducer module with real-time torque sensing, which prevents its wires from torsion and stretch.

For achieving the foregoing objective, the reducer module of the present invention comprises:

a casing, being tubular and cannular with two ends thereof open so as to define an axial through hole therein;

a ring, being received in the through hole of the casing and having an inner circle and an outer circle wherein the inner circle has a plurality of radially raised ribs that fit the inner circle in the outer circle;

a front harmonic reducer, being received in the through hole of the casing and located in front of the ring in a transmission axis direction, wherein the front harmonic reducer in the casing is connected to the inner circle of the ring for decelerating output;

a rear harmonic reducer, being structurally identical to the front harmonic reducer, received in the through hole of the casing and located and located behind the ring in the transmission axis direction but in opposite orientation relative to the front harmonic reducer, wherein the rear harmonic reducer in the casing is connected to the outer circle of the ring for accelerating output; and a plurality of torque sensors, being mounted on the ribs of the ring, so that when the inner circle is driven by the front harmonic reducer and receives a force, the torque sensors measure a torque value at the ribs;

wherein the inner circle, the front harmonic reducer, and the rear harmonic reducer are centrally bored to form an axial channel through which wires electrically connected to the torque sensors go out the reducer module.

Therein, the torque sensors are strain gages, so that when the ribs have strains due to the received force, the torque sensors measure levels of deformation at where the strains happen and convert the measured levels into the corresponding torque value.

Therein, the front harmonic reducer has one end thereof outside the casing connected to a hollow motor, and the rear harmonic reducer has one end thereof outside the casing connected to an output member.

Therein, the front harmonic reducer is connected to the hollow motor through an input adapting plate in the casing, and the rear harmonic reducer is connected to the outer circle through an output adapting plate in the casing.

Therein, each of the harmonic reducers comprises a pulsed rotator, a flexible sleeve and an outer circle, the pulsed rotator being elliptic, the flexible sleeve being mounted around an outer periphery of the pulsed rotator and consequently being elliptic, the flexible sleeve being received in the outer circle, the flexible sleeve having its outer periphery provided with an external teethed portion, and the outer circle having its inner periphery provided with an internal teethed portion, so that when the flexible sleeve fits the pulsed rotator and is elliptic, the external teethed portion only engages with the internal teethed portion of the outer circle at two major-axis ends of the pulsed rotator.

DETAILED DESCRIPTION OF THE INVENTION

Figure 1:
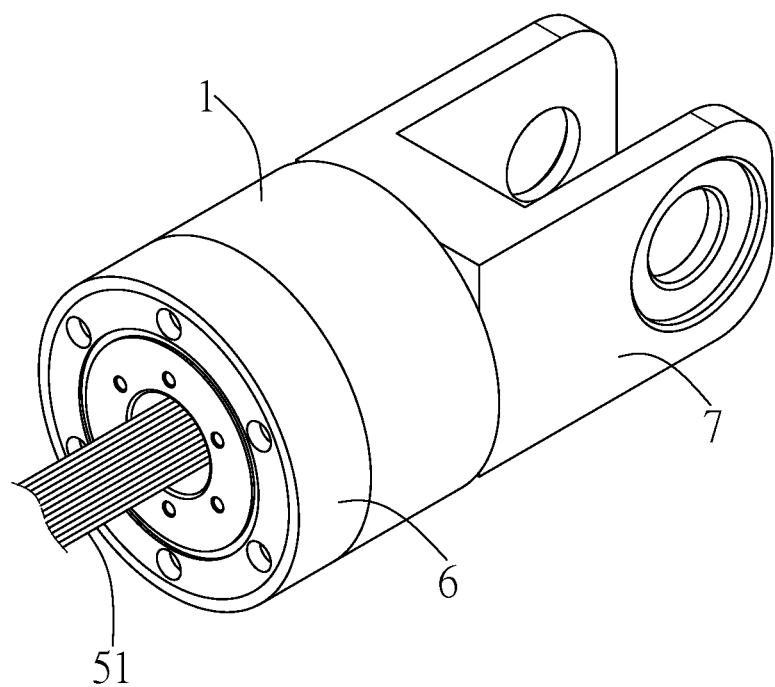
FIG. 1 is a perspective view of a reducer module according to one embodiment of the present invention.

Referring to FIG. 1 through FIG. 5, one embodiment of the present invention is depicted to exemplificatively show a preferred structure of the subject matter and not intended to limit the scope of the present invention.

According to the present invention, a reducer module with real-time torque sensing in the present embodiment is applied to a robot arm and comprises a casing 1, a ring 2, a front harmonic reducer 3, a rear harmonic reducer 4, and a plurality of torque sensors 5.

Figure 2:
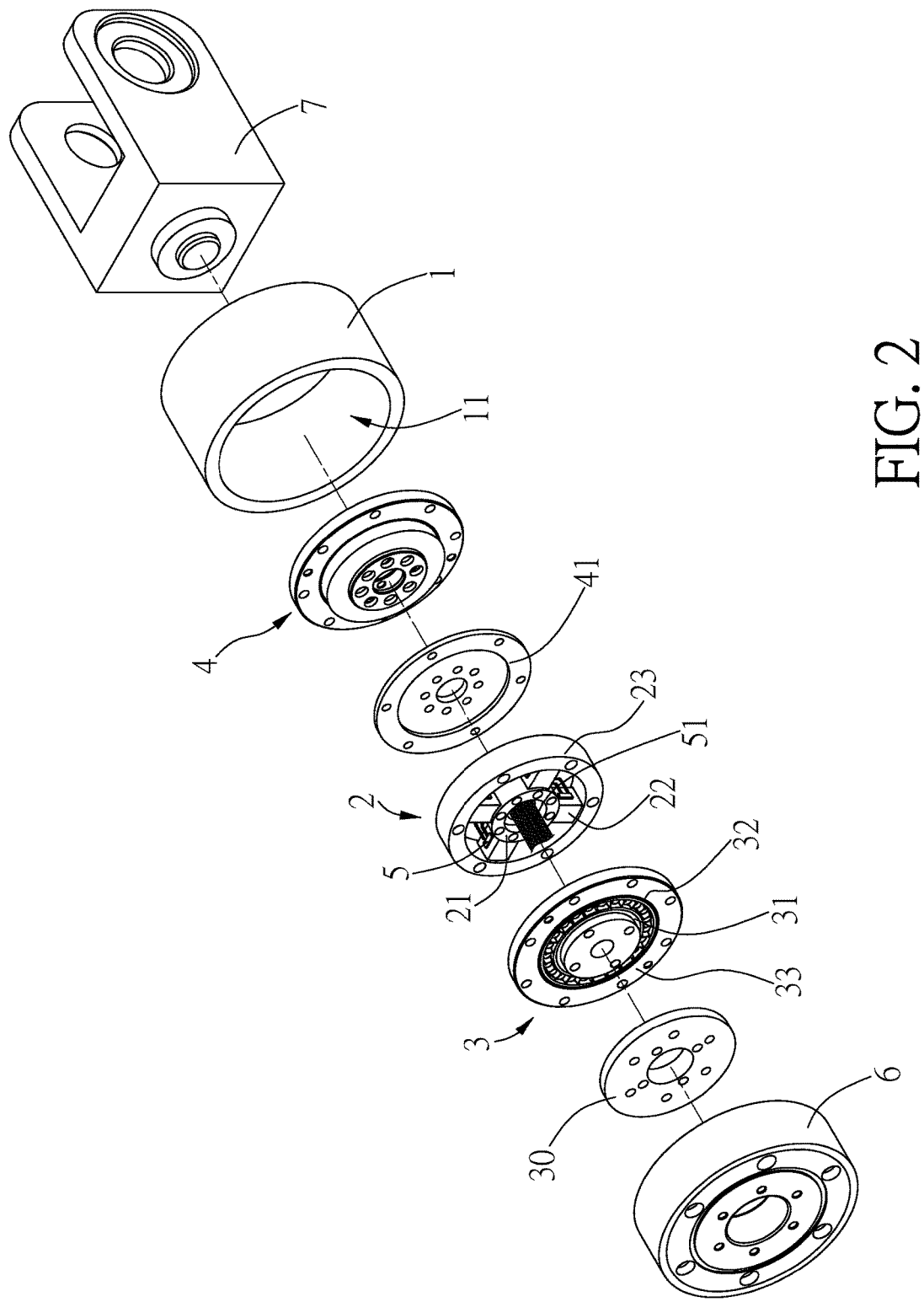
FIG. 2 is an exploded view of the reducer module according to the embodiment of the present invention.
Figure 3:
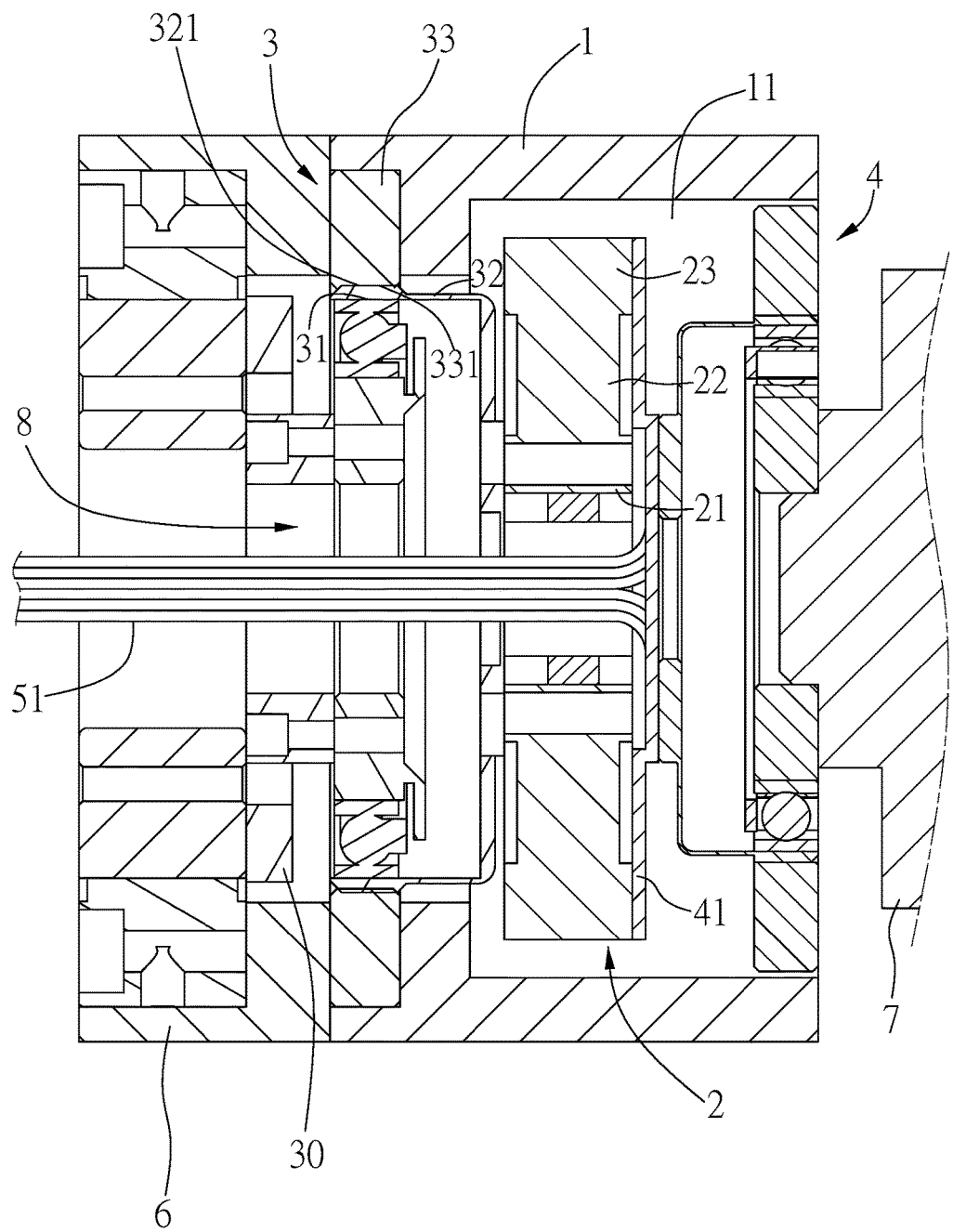
FIG. 3 is a cross-sectional view of the reducer module according to the embodiment of the present invention.

As shown in FIG. 2 and FIG. 3, the casing 1 is tubular and cannular, with its two ends open, so that a through hole 11 is defined therein. The ring 2 is received in the through hole 11 of the casing 1. The ring 2 is composed of an inner circle 21 that has a plurality of radially raised ribs 22 by which it engages with an outer circle 23 from inside. The front harmonic reducer 3 is such received in the through hole 11 of the casing 1 that it is in front of the ring 2 in the transmission axis direction. The front harmonic reducer 3 in the casing 1 is connected to the inner circle 21 of the ring 2 for decelerating output. The rear harmonic reducer 4 is structurally identical to the front harmonic reducer 3 and is also received in the through hole 11 of the casing 1, but is located behind the ring 2 in the transmission axis direction. The rear harmonic reducer 4 is installed in opposite orientation relative to the front harmonic reducer 3. The rear harmonic reducer 4 in the casing 1 is connected to the outer circle 23 of the ring 2 for accelerating output. A plurality of torque sensors 5 are mounted on the ribs 22 of the ring 2 so that when the inner circle 21 is driven by the front harmonic reducer 3 and receives a force, the torque sensors 5 measure a torque value at the ribs 22.

In the present embodiment, the torque sensors 5 are strain gages. When the ribs 22 have strains upon receiving external force, the torque sensors 5 measure levels of deformation at where strains happen and convert the measured levels into the corresponding torque value. In addition, the front harmonic reducer 3 has its one end outside the casing 1 connected to a hollow motor 6, and the rear harmonic reducer 4 has its one end outside the casing 1 connected to an output member 7. Particularly, the front harmonic reducer 3 is connected to the hollow motor 6 by means of an input adapting plate 30 in the casing 1, and the rear harmonic reducer 4 is connected to the outer circle 23 of the ring 2 by means of an output adapting plate 41 in the casing 1.

Figure 5:
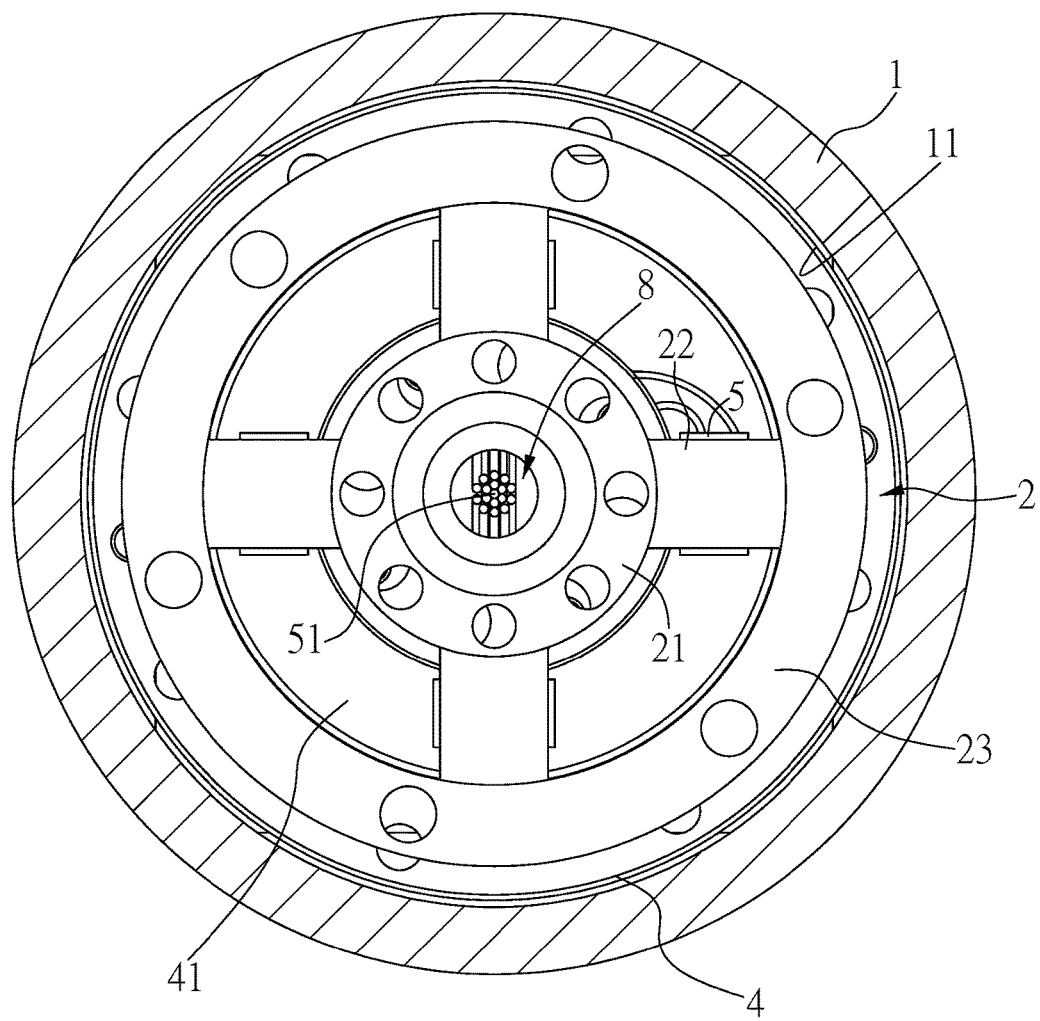
FIG. 5 shows a ring inside a casing of the reducer module according to the embodiment of the present invention.
Figure 6:
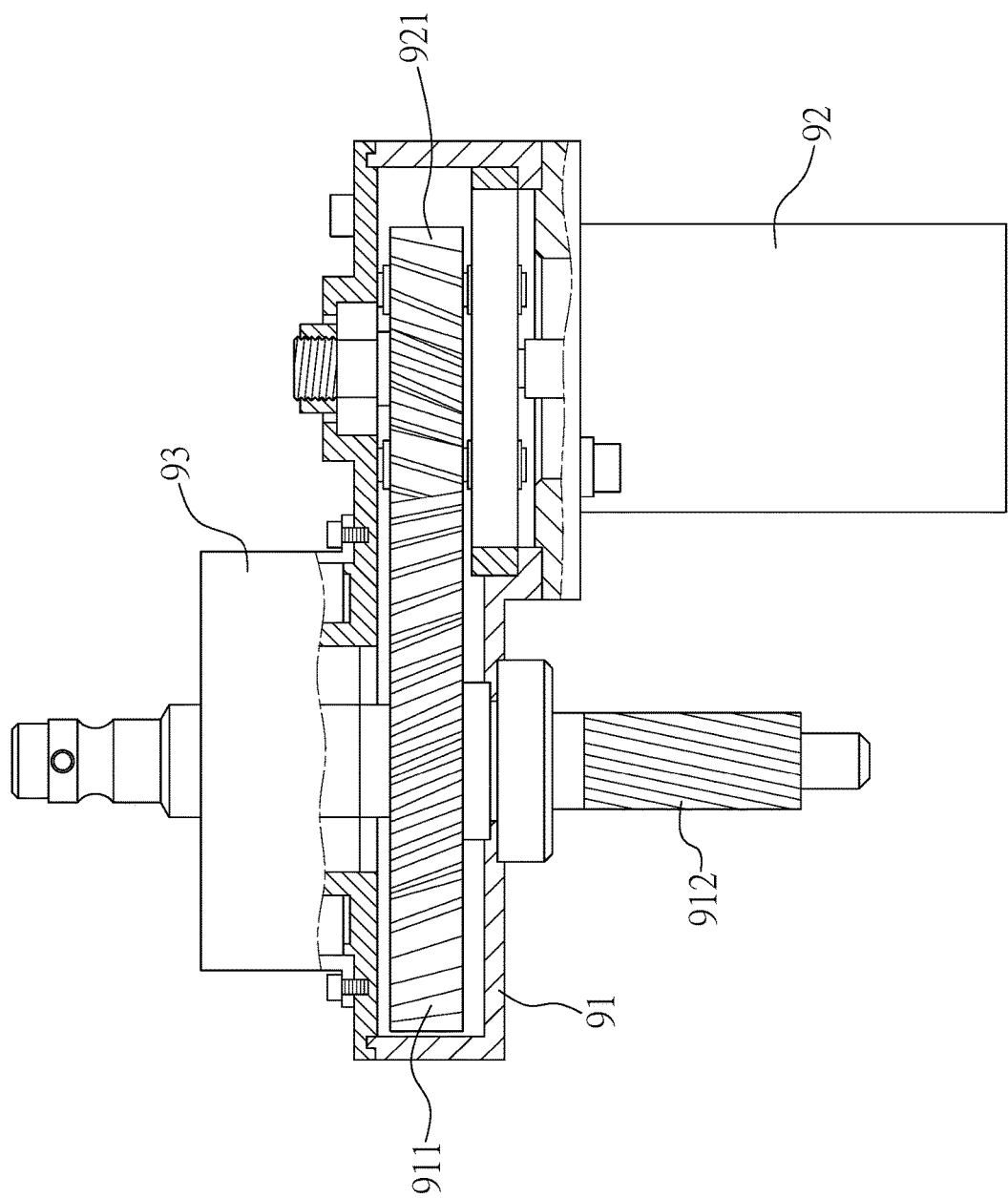
FIG. 6 is a cross-sectional view of a conventional reducer module with torque sensing.

As shown in FIG. 3, the inner circle 21, the front harmonic reducer 3, and the rear harmonic reducer 4 are centrally bored to form an axial channel 8 through which wires 51 in electrical connection with the torque sensors 5 go out the reducer module, as shown in FIG. 1 and FIG. 5.

Figure 4:
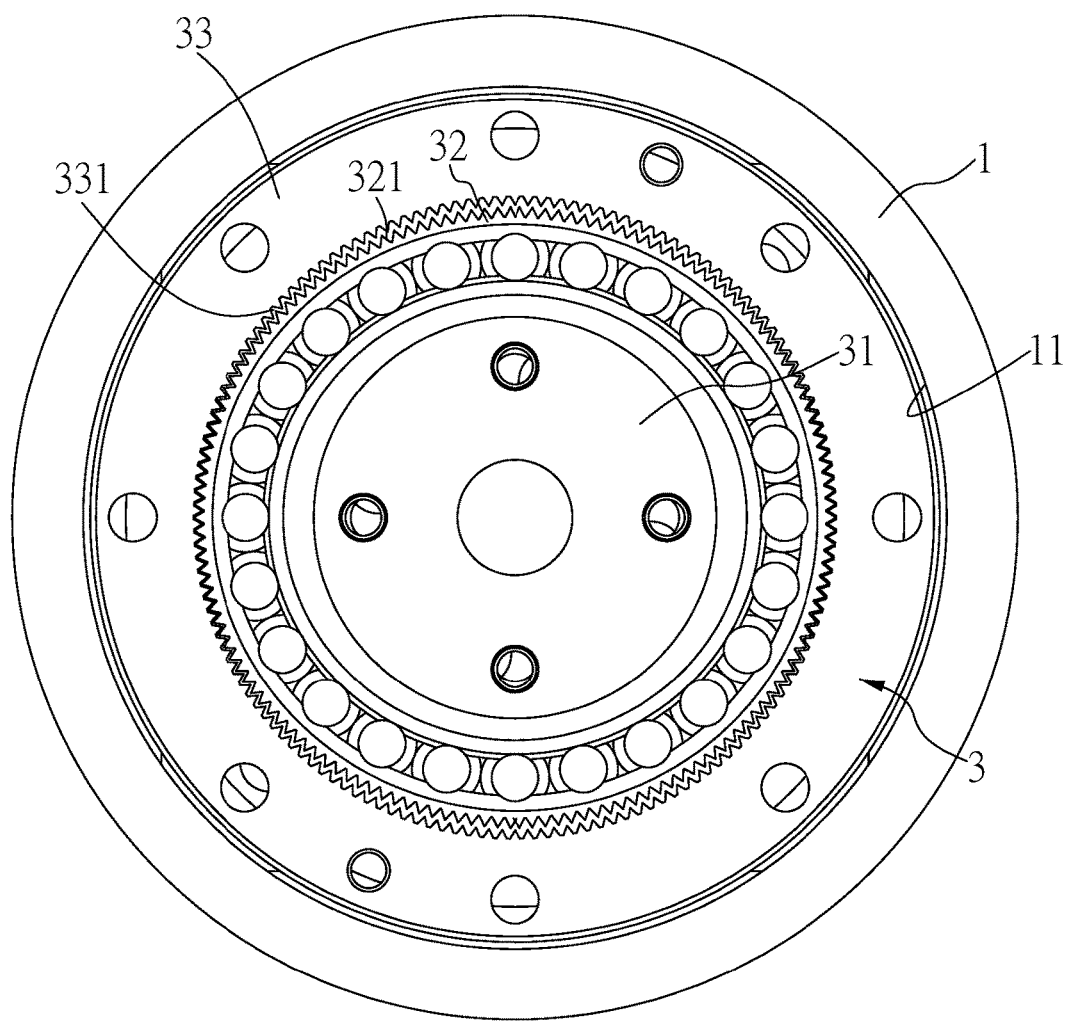
FIG. 4 illustrates operation of a front harmonic reducer in the reducer module according to the embodiment of the present invention.

Referring to FIG. 2 through FIG. 4, in the present embodiment, the front harmonic reducer 3 has a pulsed rotator 31, a flexible sleeve 32, and an outer circle 33. The pulsed rotator 31 is elliptic. The flexible sleeve 32 is mounted around the outer periphery of the pulsed rotator 31 and correspondingly elliptic. The flexible sleeve 32 is located inside the outer circle 33. The flexible sleeve 32 is provided with an external teethed portion 321 along its outer periphery. The outer circle 33 is provided with an internal teethed portion 331 along its inner periphery. As shown in FIG. 4, when the flexible sleeve 32 deforms into elliptic with the pulsed rotator 31 around which it is mounted, the external teethed portion 321 merely engages with the internal teethed portion 331 of the outer circle 33 at its parts corresponding to two major-axis ends of the of the pulsed rotator 31. In the present embodiment, the rear harmonic reducer 4 is structurally identical to the front harmonic reducer 3, but the two reducers are located at two sides of the ring 2 in the through hole 11 of the casing 1 and arranged in opposite orientations.

In operation, the hollow motor 6 drives the front harmonic reducer 3 to act, and this means it drives the pulsed rotator 31 to rotate and in turn makes the flexible sleeve 32 to engage with the internal teethed portion 331 of the outer circle 33 at different parts of the external teethed portion 321 successively, so that the flexible sleeve 32 decelerates the output from the hollow motor 6, and drives the ring 2 to rotate, before driving the rear harmonic reducer 4 to act through the ring 2. The rear harmonic reducer 4 acts in a way opposite to that of the front harmonic reducer 3 and functions for acceleration. When the ring 2 rotates, it receives force at the inner circle 21, and the force is transferred to the outer circle 23 through the ribs 22, so the torque sensors 5 can measure levels of deformation caused by strains happening at the ribs 22, and convert the measured levels into a corresponding torque value.

The advantage of the present invention is thus clear from the above description. When the front harmonic reducer 3 is driven to act, it drives the rear harmonic reducer 4 to rotate through the ring 2. At this time, the front harmonic reducer 3 and the rear harmonic reducer 4 installed in opposite orientations rotate in the same direction. Thus, when the disclosed module is used in a robot arm, wires 51 electrically connected the torque sensors 5, as shown in FIG. 5, pass through the axial channel 8 formed at centers of the inner circle 21, the front harmonic reducer 3, and the rear harmonic reducer 4 from the inner circle 21 to the pulsed rotator 31 of the front harmonic reducer 3, and come out from the hollow motor 6. With such configuration, the wires are prevented from torsion and stretch despite postural change of the robot arm.

What is claimed is:

1. A reducer module with real-time torque sensing, comprising:
   a casing, being tubular and cannular with two ends thereof open so as to define an axial through hole therein;
   a ring, being received in the through hole of the casing and having an inner circle and an outer circle wherein the inner circle has a plurality of radially raised ribs that fit the inner circle in the outer circle;
   a front harmonic reducer, being received in the through hole of the casing and located in front of the ring in a transmission axis direction, wherein the front harmonic reducer in the casing is connected to the inner circle of the ring for decelerating output;
   a rear harmonic reducer, being structurally identical to the front harmonic reducer, received in the through hole of the casing and located behind the ring in the transmission axis direction but in opposite orientation relative to the front harmonic reducer, wherein the rear harmonic reducer in the casing is connected to the outer circle of the ring for accelerating output; and
   a plurality of torque sensors, being mounted on the ribs of the ring, so that when the inner circle is driven by the front harmonic reducer and receives a force, the torque sensors measure a torque value at the ribs;
   wherein the inner circle, the front harmonic reducer, and the rear harmonic reducer are centrally bored to form an axial channel through which wires electrically connected to the torque sensors go out the reducer module.

2. The reducer module of claim 1, wherein the torque sensors are strain gages, so that when the ribs have strains due to the received force, the torque sensors measure levels of deformation at where the strains happen and convert the measured levels into the corresponding torque value.

3. The reducer module of claim 1, wherein the front harmonic reducer has one end thereof outside the casing connected to a hollow motor, and the rear harmonic reducer has one end thereof outside the casing connected to an output member.

4. The reducer module of claim 3, wherein the front harmonic reducer is connected to the hollow motor through an input adapting plate in the casing, and the rear harmonic reducer is connected to the outer circle through an output adapting plate in the casing.

5. The reducer module of claim 1, wherein each of the harmonic reducers comprises a pulsed rotator, a flexible sleeve and an outer circle, the pulsed rotator being elliptic, the flexible sleeve being mounted around an outer periphery of the pulsed rotator and consequently being elliptic, the flexible sleeve being received in the outer circle, the flexible sleeve having its outer periphery provided with an external teethed portion, and the outer circle having its inner periphery provided with an internal teethed portion, so that when the flexible sleeve fits the pulsed rotator and is elliptic, the external teethed portion only engages with the internal teethed portion of the outer circle at two major-axis ends of the pulsed rotator.

* * * * *